United States Patent [19]

Habib et al.

[11] Patent Number: 5,071,233

[45] Date of Patent: Dec. 10, 1991

[54] ELECTROCHROMIC DEVICE WITH OXYMETHYLENE-POLYOXYETHYLENE ELECTROLYTE

[75] Inventors: Mohammad A. Habib, Troy; Shyam P. Maheswari, Rochester Hills; Donald M. Mac Arthur, Troy; Richard L. Adams, Ferndale, all of Minn.

[73] Assignee: General Motors Corporation, Detroit, Mich.

[21] Appl. No.: 604,308

[22] Filed: Oct. 29, 1990

[51] Int. Cl.$^5$ ................................................ G02F 1/01
[52] U.S. Cl. ...................................... 359/275; 359/265
[58] Field of Search ................................. 350/357, 355

[56] References Cited

U.S. PATENT DOCUMENTS

| | | | |
|---|---|---|---|
| 4,304,465 | 12/1981 | Diaz | 350/357 |
| 4,750,817 | 6/1988 | Sammells | 350/357 |
| 4,874,229 | 10/1989 | Ito et al. | 350/357 |
| 4,938,571 | 7/1990 | Cogan et al. | 350/357 |
| 4,958,917 | 9/1990 | Hashimoto et al. | 350/357 |
| 4,960,323 | 10/1990 | Demiryont | 350/357 |
| 4,960,324 | 10/1990 | Brown | 350/357 |

FOREIGN PATENT DOCUMENTS 1-69616  3/1989  Japan .

Primary Examiner—Rolf Hille
Assistant Examiner—Mahshid Saadat
Attorney, Agent, or Firm—George A. Grove

[57] ABSTRACT

An electrochromic cell is provided having a Li$^+$ doped oxymethylene-polyoxyethylene solid polymer electrolyte. The film of ionically doped oxymethylene-polyoxyethylene is sandwiched between two complementary electrochromic layers, one of which is tungsten oxide. The other electrochromic layer is a polyaniline or a Prussian Blue material. The complementary electrochromic layers are deposited onto electrically conductive transparent substrates, such as fluorine-doped tin oxide coated glass. The electrochromic cell colors and bleaches by the application of an appropriate electrical potential between the two electrochromic films. The Li$^+$ doped oxymethylene-polyoxyethylene electrolyte is stable at elevated temperatures up to about 100° C.

8 Claims, 1 Drawing Sheet

ELECTROCHROMIC DEVICE WITH OXYMETHYLENE-POLYOXYETHYLENE ELECTROLYTE

The present invention generally relates to solid state electrochromic devices. More particularly, this invention relates to adjustably transparent glass suitable for use at a wide range of temperatures such as when used in an automobile, wherein the glass consists essentially of an electrochromic cell having two oppositely disposed, complementary electrochromic layers and an intermediate solid polymer electrolyte capable of withstanding temperatures of up to about 100° C.

BACKGROUND OF THE INVENTION

Within the automotive industry particularly, there has long been a desire for a glass that changes transparency to adjust for conditions of brightness. Automotive glass has been formed from photochromic materials which automatically adjust their transparency with changes in the light intensity. However, these materials do not permit the user to change or adjust the degree of transparency, making them undesirable for widespread automotive use.

Alternatively, electrochromic materials are characterized by optically variable properties and therefore are suitable for use within an automobile. Windows formed from electrochromic materials permit the occupants to control the light transmission into the vehicle. Electrochromic glasses may be used for privacy considerations, or to control solar generated heat or glare within the automobile.

An electrochromic device reversibly colors to a shade, such as dark blue, and clears to transparency, by electrochemical reduction and oxidation when an appropriate voltage is applied to the electrochromic cell. The reversible electrochemical reactions occur at low operating voltages provided by an external power supply, and the changes in coloration occur over a relatively short period of time. Once the desired coloration is achieved, the electrochromic windows could maintain the same intensity of coloration without the aid of the external power supply.

The basic structure of such an electrochromic window is an electrochromic cell consisting of three types of thin film materials. First, a transparent electrically conductive film is provided on a transparent glass support to collect and generate the required current. The electrochromic cell requires two of these glass supports each having the transparent electrically conductive film. Second, an electrochromic film is provided on each of the transparent electrically conductive films to form the optoelectroactive elements of the electrochromic cell. Generally, electrochromic devices utilize two different, but complementary, electrochromic materials, typically tungsten oxide ($WO_3$) with Prussian Blue $MFe^{III}[Fe^{II}(CN)_6]$ where M is a metal ion, or tungsten oxide with polyaniline. Lastly, the cell is formed by providing a film of an ionically conductive electrolyte between the two electrochromic films. The ionically conductive electrolyte provides the ions for the electrochromic process. The selection of an appropriate ionically conductive electrolyte is critical to the performance of the electrochromic cell.

Many types of ionically conductive electrolytes have been proposed by the art for electrochromic devices. Complementary electrochromic cells of the tungsten oxide and Prussian Blue have been made with ionically conductive electrolytes, such as a $Li^+$ doped propylene carbonate or a polyamp material. In addition, the polyamp electrolyte material has been used in a complementary electrochromic cell between an electrochromic film of tungsten oxide and a second electrochromic film of a derivative of benzyl polyaniline.

However, despite the many varieties of electrochromic devices now available, a significant shortcoming exists with regard to these devices. An electrochromic cell within a window in an automobile will experience a wide range of temperatures from well below 0° C. to in excess of 100° C. The known polymer electrolytes used throughout the art, fail either due to inadequate conductivity at the low temperature or instability at the high temperature.

Therefore what is needed is an electrochromic device for use in an automobile window which can satisfactorily function between the temperature extremes experienced during normal automotive use.

SUMMARY OF THE INVENTION

It is the primary object of this invention to provide an electrochromic device.

Further, it is also an object of this invention that such an electrochromic device be suitable for use in an automobile window and accordingly satisfactorily function throughout the wide temperature range experienced by an automobile.

In accordance with a preferred embodiment of this invention, these and other objects and advantages are accomplished as follows.

We are the first to provide an electrochromic device which can operate at elevated temperatures up to about 100° C. The electrochromic device consists essentially of a film of a solid polymer electrolyte sandwiched between two transparent electrically conducting glass supports, one of which is coated with a thin electrochromic film of tungsten oxide. The other support is coated with a complementary electrochromic material, such as a Prussian Blue or a polyaniline film.

An inventive feature of this invention is that the solid polymer electrolyte film consists of ionically doped oxymethylene-polyoxyethylene. The oxymethylene-polyoxyethylene is synthesized and doped with $Li^+$ ions. The resulting electrochromic device having the $Li^+$ doped oxymethylene-polyoxyethylene electrolyte, colors and bleaches by the application of a sufficient electrochemical potential between the complementary electrochromic films, about 2 Volts. The polymer electrolyte is stable up to temperatures of about 100° C. making the device suitable for use in many applications including as an automobile window.

Other objects and advantages of this invention will be better appreciated from a detailed description thereof, which follows.

DETAILED DESCRIPTION OF THE PREFERRED EMBODIMENT

Figure 1:
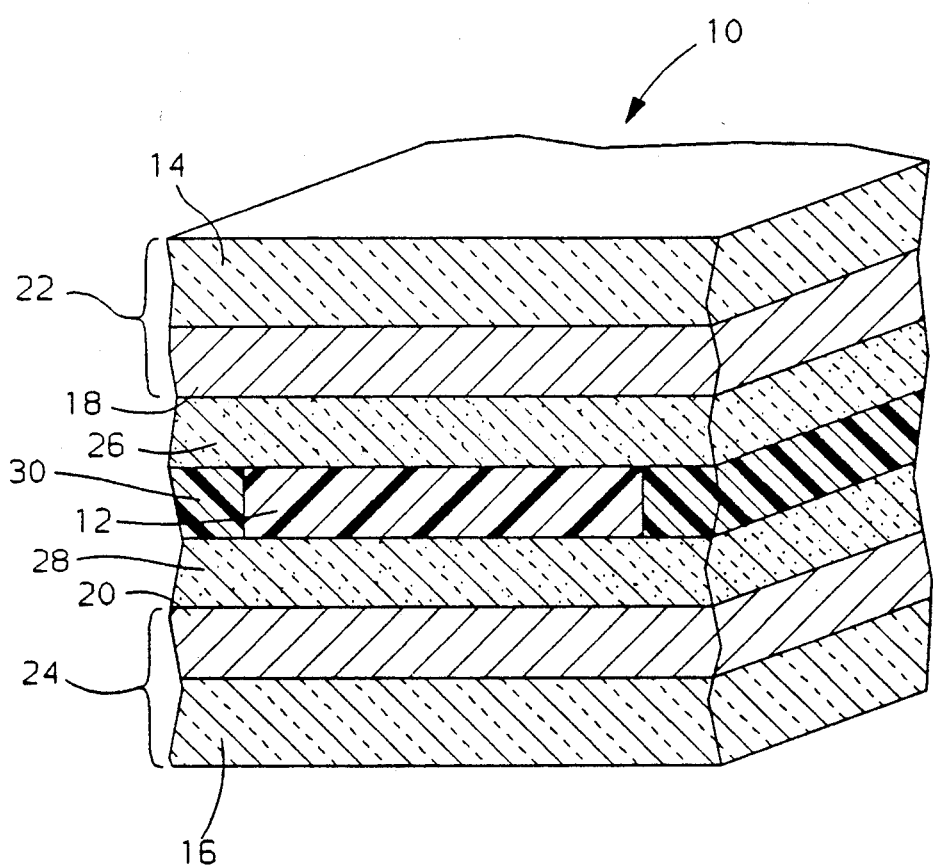
FIG. 1 is a cross-sectional view of the electrochromic device formed in accordance with a preferred embodiment of this invention.

As shown in FIG. 1, an electrochromic device 10 is provided which contains a $Li^+$ doped oxymethylene-polyoxyethylene solid polymer electrolyte layer 12. (FIG. 1 is not to scale for purposes of better illustrating the features of this invention.) The electrochromic device 10 is suitable for use at elevated temperatures due to the stability at these temperatures of the Li+doped oxymethylene-polyoxyethylene layer 12.

Starting materials included the transparent supports 14 and 16 for the electrochromic device 10. A surface of the transparent supports 14 and 16 is coated with an electrically conductive layer 18 and 20 of material. Electrically conductive, fluorine-doped tin-oxide (FTO) was utilized. FTO coated glass sheets 22 and 24 were available from the Watkins-Johnson Company of California, although other electrically conductive transparent materials, such as indium-doped tin oxide (ITO) coated glass or a transparent plastic having the FTO or ITO coatings, could also foreseeably be utilized. The resistance of the FTO layers 18 and 20 varied between about 10–15 Ohms per square. For practicality purposes in developing and testing this invention, the FTO coated glass sheets 22 and 24 were diamond cut into approximately $0.9 \times 5$ cm$^2$ pieces and the electrochromic devices 10 formed on those pieces. It is foreseeable that one skilled in the art could use the principles of this invention with much larger transparent substrates, such as an automobile window, and satisfactorily obtain equivalent results.

Prior to the subsequent deposition of the electrochromic films, the FTO coated glass substrates 22 and 24 were cleaned in an appropriate soap solution, such as a detergent like Alconox, followed by an ultrasonic cleaning in tri-distilled water. The glass slides were further cleaned with dilute aqueous HNO$_3$ and rinsed with isopropyl alcohol. The cleaned substrates 22 and 24 were stored in tri-distilled water. A thorough cleaning process such as the one utilized is necessary to ensure good adhesion between the FTO coated transparent substrates 22 and 24 and the subsequently deposited electrochromic films.

An electrochromic film of tungsten oxide, WO$_3$, was formed on one of the FTO-coated glass substrates (either 22 or 24, but for purposes of this description, it will be shown as being formed on FTO coated substrate 22) by non-electrochemical methods. One method for forming the WO$_3$ films was as follows. WCl$_6$ was dissolved in isopropyl alcohol whereby a colloidal solution was formed containing the desired form of WO$_3$. This solution was spun onto the FTO coated transparent substrate 22, so that the tungsten-containing solution contacted the FTO layer 18. WO$_3$ films were also formed on the FTO coated glass substrate 22 by conventional rf-sputtering as well as conventional dc-sputtering techniques.

A film 28 of Prussian Blue MFe$^{III}$[Fe$^{II}$(CN)$_6$] where M is a metal ion, a complementary electrochromic material to the WO$_3$, was cathodically deposited onto the other FTO coated glass substrate 24, from an acidic ferric ferricyanide solution (pH about 4). A current density of about 10 microAmps/cm$^2$ was used for about 500 seconds. The Prussian Blue was deposited so as to contact the FTO layer 20 of the glass substrate 24. The Prussian Blue film 28 may be formed by other techniques as well.

In addition, polyaniline is also a complementary electrochromic material to WO$_3$, and may be utilized instead of the Prussian Blue with equally satisfactory results. Polyaniline films were prepared by the electropolymerization of aniline from an aqueous solution of 1 mol. dm$^{-3}$ HCl and 1 mol. dm$^{-3}$ aniline onto the FTO coated glass substrate, so as to contact the FTO coated surface. A current density of about 2 milliAmps/cm$^2$ was used. Other techniques for forming these films of polyaniline may also be utilized.

Next, the solid polymer electrolyte, Li+doped oxymethylene-polyoxyethylene was prepared using the following preferred method.

The preparation of the oxymethylene-polyoxyethylene was carried out in a N$_2$ atmosphere in a glove bag so as to prevent oxidation of the components. The glove bag is not necessary so long as the preparations take place in an inert, oxygen-free atmosphere. About 50 g of finely ground KOH was placed in a 1000 ml flask and about 200 ml of CH$_2$Cl$_2$ was added. This mixture was stirred by a mechanical stirrer as vigorously as feasible to ensure thorough and intimate mixing of the constituents. While stirring the mixture, about 50 ml of polyethylene glycol 400 (PEG 400) was added using a dropping funnel. The funnel was rinsed twice using about 10 ml of CH$_2$Cl$_2$ each time to ensure removal of the PEG 400 from the dropping funnel. The entire process was also carried out in the dark to prevent light from entering during the reaction period. This is necessary since ultraviolet light inhibits the proper polymerization of the components.

After about 20 hours of continuous mixing, the resulting oxymethylene-polyoxyethylene polymer was removed from the reaction flask and 300 ml of CH$_2$Cl$_2$ was added in order to make a very dilute mixture. The mixture was then filtered through a glass frit filter which contained about $\frac{3}{4}$" of CELITE (diatomaceous earth). This is placed on top of glass frit to ensure that even small particles of KOH will not pass through the filter. After filtration the polymer is placed in a separatory funnel and water is added to rinse the polymer. To ensure all traces of KOH is removed, after rinsing the polymer was allowed to separate from the water. Upon separation the polymer settled to the bottom and water remained on top. The two phases could be distinctly seen. After the polymer was drawn from the separatory funnel, the CH$_2$Cl$_2$ was drawn off from the polymer using a standard roto-vapor.

In order to separate the high molecular weight oxymethylene-polyoxyethylene from the low molecular weight oxymethylene-polyoxyethylene, the polymer was dissolved in approxiately 300 ml of toluene. This solution was then stirred at room temperature and 100 to 125 ml of Heptane was added slowly until the solution turned cloudy in appearance. This mixture was then heated until the solution turned clear allowing the polymer to dissolve back into solution. This was then allowed to cool back to room temperature, whereby the high molecular weight polymer settled out on the bottom and the low molecular weight polymer on the top. Two separate phases can be seen, allowing easy separation of the two phases. It is desirable to keep the high molecular weight and low molecular weight polymers separate, since they are characterized by different properties. The high molecular weight oxymethylene-polyoxyethylene is solid-like and therefore relatively easy to use in the electrochromic cell, but it is also characterized by a relatively low conductivity and accordingly a slower response time within the electrochromic cell. Alternatively, the low molecular weight oxymethylene-polyoxyethylene polymer is more gel-like and therefore relatively more cumbersome to work with in the electrochromic cell yet it is characterized by a higher conductivity and correspondingly faster response time. In practice the shortcomings of either material are minimal, and depending on the desired application either the low or high molecular weight material may be used with satisfactory results. Any remaining toluene was drawn from the polymer under vacuum. When dry, the polymer was stored in an argon atmosphere dry box.

The polymer, oxymethylene-polyoxyethylene, was doped with $Li^+$ ions by dissolving the oxymethylene-polyoxyethylene and $LiClO_4$ in the ratio of about 1:6 in a mixture of toluene and tetrahydrofuran. The solvents were then drawn off under vacuum, leaving the desired $Li^+$ doped oxymethylene-polyoxyethylene solid polymer electrolyte. The $Li^+$ ion is preferred, although other ionic species may be used, such as ionic species of potassium, sodium or hydrogen ($H^+$), because the $Li^+$ ion does not cause degradation of any of the materials within the electrochromic cell.

The electrochromic cell 10 formed in accordance with a preferred embodiment of this invention is shown in FIG. 1. The electrochromic cell 10 consists of complementary electrochromic layers 26 and 28, either the $WO_3$ and Prussian Blue combination or the $WO_3$ with polyaniline. Either combination of the complementary materials may be utilized with equivalent results. As shown, the solid polymer electrolyte, i.e., the $Li^+$ doped oxymethylene-polyoxyethylene, layer 12 is sandwiched between the two complementary electrochromic layers 26 and 28, so as to contact the two electrochromic layers 26 and 28. A Teflon spacer 30 circles the solid polymer electrolyte layer 12 and separates the two electrochromic layers 28 and 30 around the perimeter of the device 10 where the solid polymer electrolyte layer 12 is not provided. The thicknesses of the various layers may be varied depending upon the desired application and the deposition techniques.

The coloration of the electrochromic cell 10 occurs when an electrochemical potential is applied between the $WO_3$ layer 26 and the other electrochromic layer 28, i.e., the Prussian Blue or the polyaniline layer, from an external potentiostat causing ionic movement between the layers 26 and 28 within the solid polymer electrolyte layer 12. When an appropriate electrical potential is applied between the two films 26 and 28, the corresponding oxidation and reduction reactions occur at the interface between each electrochromic layer 26, 28 and the solid polymer electrolyte 12, causing reversible coloration changes in the films 26 and 28. When the $WO_3$ film 26 is made anodic by applying a positive potential of about 2-3 Volts to it with reference to the other electrochromic film 28, the $WO_3$ film becomes oxidized and turns clear or transparent. Accordingly, the complementary film 28 of Prussian Blue or polyaniline is reduced and also becomes clear or transparent. Therefore, to the viewer, the entire electrochromic cell 10 would appear transparent.

In order to color the electrochromic cell 10, the positive potential of about 2-3 Volts is applied to the Prussian Blue or polyaniline layer 28 making it anodic with reference to the $WO_3$ layer 26. The oxidation of the Prussian Blue or polyaniline layer 28 turns the material a deep shade of blue. The corresponding reduction of the $WO_3$ layer 26 causes it to color to a dark blue also. The result is a deep blue color for the electrochromic cell 10.

The absorbance of the electrochromic cell undergoes a change of nearly 0.5 absorbance units (a relative term) between the reduced and the oxidized states. Upon application of a potential of about $-3$ Volts to the $WO_3$ layer 26 with reference to the other electrochromic layer 28, the absorbance increases with increasing wavelength starting from about 500 nanometers, confirming the dark blue color change. By reversing the applied potential to about $+3.0$ Volts, the absorbance decreased to a residual value of about 0.5 absorbance units over the entire spectral range of about 500 to 850 nanometers, confirming the color change to transparency. The residual absorbance of about 0.5 units was due to the background absorption by the glass and is non-switchable.

Switching time during coloration and bleaching of the electrochromic cell 10 is less than about a minute and can be varied depending upon the average molecular weight of the $Li^+$ doped oxymethylene-polyoxyethylene solid polymer electrolyte utilized. The lower molecular weight species will exhibit faster switching times than the higher molecular weight species. In addition, the $Li^+$ doped oxymethylene-polyoxyethylene solid polymer electrolyte was stable up to about 100° C., thereby the electrochromic cell may be used at elevated temperatures up to about 100° C.

This invention provides an electrochromic device suitable for use at elevated temperatures. Although this invention has been described in terms of a preferred embodiment, alternative embodiments are also possible and considered within the scope of this invention, such as the use of a different ionic species within the solid polymer electrolyte, or different complementary electrochromic materials, or different electrically conductive transparent supports. Accordingly, our invention is to be limited only by the following claims.

The embodiments in which an exclusive property or privilege is claimed are defined as follows:

1. An electrochromic device comprising:
    first and second transparent supports, each having an electrically conductive film deposited thereon;
    first and second electrochromic films deposited onto said first and second transparent supports, respectively, so that each of said electrochromic films contacts said electrically conductive film on said supports; and
    an electrolyte film of ionically doped oxymethylene-polyoxyethylene, operable over the temperature range from about 0° C. to 100° C., between and contacting each of said first and second electrochromic films.

2. An electrochromic device as recited in claim 1 wherein said first and second electrochromic films are tungsten oxide and Prussian Blue respectively.

3. An electrochromic device as recited in claim 1 wherein said first and second electrochromic films are tungsten oxide and polyaniline respectively.

4. An electrochromic device as recited in claim 1 wherein said film of ionically doped oxymethylene-polyoxyethylene is doped with $Li^+$ ions.

5. An electrochromic device comprising:
    first and second transparent supports, each having an electrically conductive film deposited thereon;
    a first electrochromic film of tungsten oxide deposited onto said first transparent support, so as to
    · electrically contact said electrically conductive film on said support;
    a second electrochromic film of Prussian Blue deposited onto said second transparent support so as to electrically contact said electrically conductive film on said support; and an electrolyte film of ionically doped oxymethylene-polyoxyethylene, operable over the temperature range from about 0° C. to 100° C., between and contacting each of said first and second electrochromic films.

6. An electrochromic device as recited in claim 5 wherein said first and second transparent supports are glass having a fluorine-doped tin oxide coating.

7. An electrochromic device comprising:

first and second transparent supports, each having an electrically conductive film deposited thereon;

a first electrochromic film of tungsten oxide deposited onto said first transparent support, so as to electrically contact said electrically conductive film on said support;

a second electrochromic film of polyaniline deposited onto said second transparent support so as to electrically contact said electrically conductive film on said support; and an electrolyte film of ionically doped oxymethylene-polyoxyethylene, operable over the temperature range from about 0° C. to 100° C., between and contacting each of said first and second electrochromic films.

8. An electrochromic device as recited in claim 7 wherein said first and second transparent supports are glass having a fluorine-doped tin oxide coating.

* * * * *